March 3, 1942.　　　S. WEBB　　　2,275,097

THREADING TOOL

Filed March 7, 1940　　　2 Sheets-Sheet 1

Inventor:
SAMUEL WEBB,
by: John E. Jackson
his Attorney.

March 3, 1942.    S. WEBB    2,275,097
THREADING TOOL
Filed March 7, 1940    2 Sheets-Sheet 2
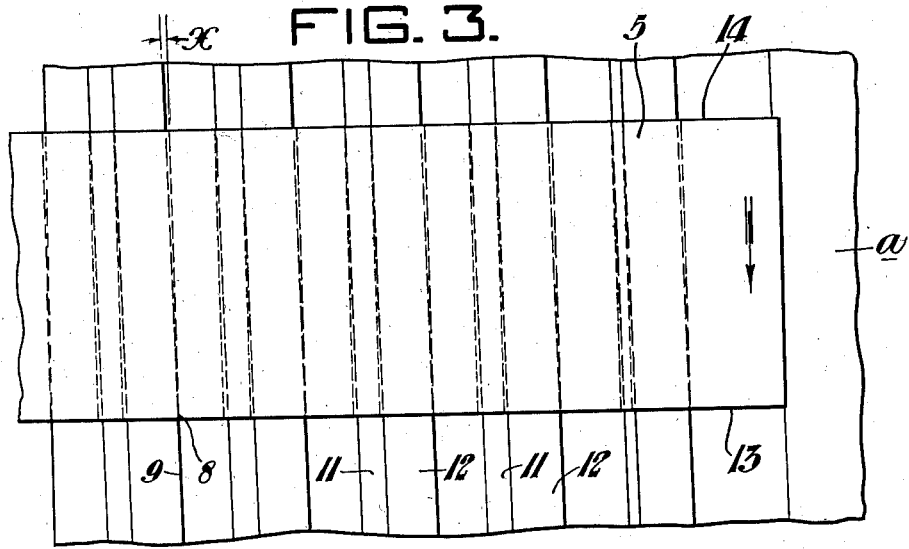
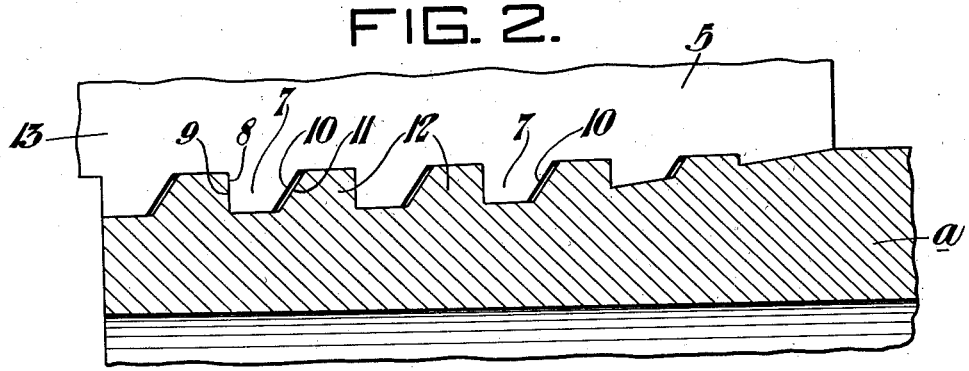
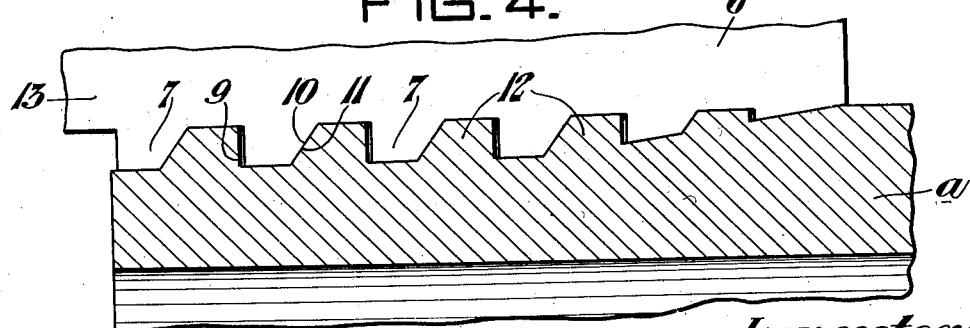
Inventor:
SAMUEL WEBB,
by John E. Jackson
his Attorney.

Patented Mar. 3, 1942

2,275,097

UNITED STATES PATENT OFFICE 2,275,097

THREADING TOOL

Samuel Webb, Pittsburgh, Pa., assignor to National Tube Company, a corporation of New Jersey Application March 7, 1940, Serial No. 322,851

7 Claims. (Cl. 10—129)

This invention relates to improvements in threading taps or dies, and more particularly to taps or dies for the cutting or chasing of threads having a flank thereof substantially normal to the thread axis.

Such threads, as for example buttress threads, have heretofore been cut on lathes in order to produce the straight normal flank thereof free of surface imperfections. However, the practice of cutting threads of this type on a lathe is highly impractical from the standpoint of commercial production.

It is an object of this invention to chase or die-cut threads of the character stated whereby the same may be commercially produced on pipes, rods, bolts and the like.

My invention contemplates an improved tap or die wherein the cutting or forming teeth are suitably disposed for cutting on the straight or substantially normal thread flank without tearing or burning of the metal of the teeth or the work.

Additional objects and advantages will become apparent from the following description, taken in connection with the accompanying drawings, wherein:

Figure 2 is an enlarged detail sectional view taken on the line II—II of Figure 1;

Figure 3 is a schematic view, showing the chaser of Figure 2 superimposed upon a portion of the thread being cut thereby;

Figure 4 is a detail section taken on the line IV—IV of Figure 1;

Figure 1:
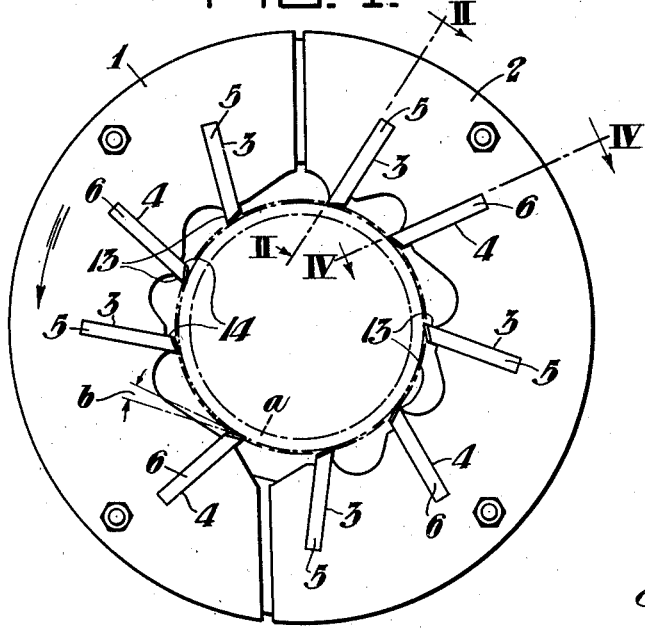
Figure 1 is a face view of a threading die embodying my invention.

Referring to the drawings, 1 and 2 designate the segments of a split die ring for mounting a plurality of chasers for the external threading of a pipe or other article a. The die ring illustrated is known as a non-rhythmic die, wherein the chasers are unequally spaced in alternate series of seats or slots designated 3 and 4. 5 and 6 indicate alternate chasers respectively positioned in the seats or slots 3 and 4, said chasers each having an edge thereof presented concentrically and inwardly of the die ring and formed with a series of cutting teeth 7 of the desired contour and pitch for threading the pipe a.

The teeth 7 of the chasers include straight flank cutting edges 8 for cutting the thread flank 9, which thread flank is desired to be normal or substantially normal to the axis of the thread, as for example, in a buttress type of thread, said teeth being of uniform profile throughout their lengths. 10 designates the diagonal or oblique cutting edges of the teeth 7 for forming the diagonal or oblique flank 11 of such a thread.

The thickness or width of the chaser teeth 7 is preferably less than the distance between the teeth 12 of the finished cut thread in order that the alternate chasers may be mounted in the die ring 1—2 in shifted relation for cutting on alternate flanks, as is common practice in V-type and other standard threads. Thus, the chasers 5 are mounted to cut the substantially normal thread flank 9 as shown in Figures 2 and 3, and the chasers 6 are mounted in shifted position for cutting on the oblique or inclined thread flank 11, as shown in Figure 4.

The chasers 5 and 6 are provided with heel clearance indicated at $b$ in Figure 1, which heel clearance provides a relief for the cutting teeth during the cutting of the oblique or inclined flanks 11 of the thread by chasers 6, as in the standard practice in the die cutting or chasing of V-type threads or the like.

My invention has particularly to do with relieving the chaser teeth in such a manner as to prevent the straight flank cutting edges 8 from scraping and rubbing along the substantially normal thread flanks 9 cut thereby. As preferred, the desired relief or clearance may be provided by inclining the chaser teeth 7 rearwardly from the flank cutting edges 8 thereof.

Thus, as shown in Figures 2 and 3, the chaser teeth 7 are inclined with respect to the parallel leading and trailing chaser faces 13 and 14, respectively, whereby upon disposing the chasers parallel with the axis of the thread to be cut thereby, said teeth will be inclined away from the flank cutting edges 8 thereof to provide suitable relief and clearance with respect to the substantially normal thread flank 9 formed thereby, the angularity providing such clearance or relief being indicated at $x$. Such chasers 5 may be mounted in and used with a standard die head of the character illustrated in Figure 1, wherein the chaser seats 3 and 4 extend in parallel relation to the axis of the head, the angularity of the chaser teeth 7 in relation to the chaser faces 13 and 14, properly positioning the chaser teeth for cutting relief or clearance as stated.

In chasing or cutting threads in the manner herein set forth, the die or tap may be rotated about the work or the work rotated in relation to a stationary tap or die as preferred, the practice being well known in the art. In the drawings, the die 1—2 is illustrated as rotating in the direction of the arrow and the pipe or work $a$ is stationary.

Figure 5:
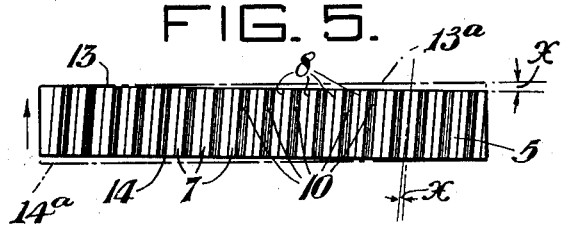
Figure 5 is an enlarged view of the toothed edge of a chaser, illustrating one manner of shaping said chaser.

Figure 5 illustrates one manner of forming the chasers, in which case the chaser teeth 7 are cut in a chaser edge by a suitable hob while the chaser is disposed parallel with the axis of the hob, said hob forming the teeth and imparting the heel clearance $b$ thereto, as will be readily understood. The chasers are next ground or faced off along the initial parallel leading and trailing faces 13$^a$ and 14$^a$ thereof indicated by the dotted lines of Figure 5, forming final parallel leading and trailing faces 13 and 14 inclined at the inclination $x$ with respect to said initial faces, whereby the chaser teeth 7 and said chaser faces are relatively inclined to provide a corresponding relief or clearance back of the flank cutting edges 8 of the teeth when said chasers are mounted in a die head as hereinbefore described.

It will be noted that the clearance or relief thus provided behind the flank cutting edges 8 of the chaser teeth 7 is in addition to or independent of the slight natural inclination imparted to the teeth during the cutting or forming thereof on the chasers by the hob, which natural inclination is due solely to the helical form of the teeth and the pitch of the thread for which said teeth are designed.

A further manner of providing clearance or relief as described, consists in pre-forming the chaser teeth 7 with the usual hob, wherein the hob is inclined with respect to the leading and trailing faces of the chaser to cut said teeth 7 with the desired angularity $x$ as will be readily understood. Chasers formed in this manner may be employed as before in die heads having chaser seats extending parallel with the die or thread axis.

Figure 6:
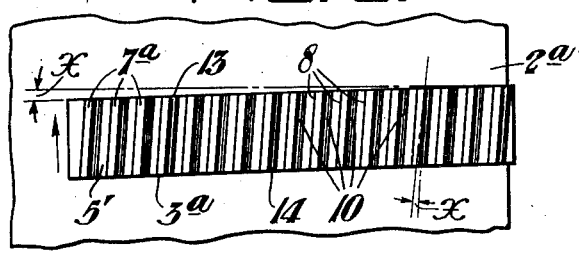
Figure 6 is a view like Figure 5, showing another form of chaser in connection with its seat in the die; and, Figures 7 and 8 are elevational views illustrating the application of my invention to a threading tap.

Figure 6 illustrates another manner of providing the desired relief or clearance for the flank cutting edges 8 of the chasers, wherein the chasers 5' have teeth 7$^a$ regularly formed by the usual hob, and said chasers are then inserted in slots or seats 3$^a$ in a die ring 2$^a$, which seats are disposed at an inclination $x$ to the axis of the die or thread to be cut thereby, which inclination will impart the desired angularity to the teeth 7$^a$ to provide a corresponding flank cutting clearance as before.

Figure 7:
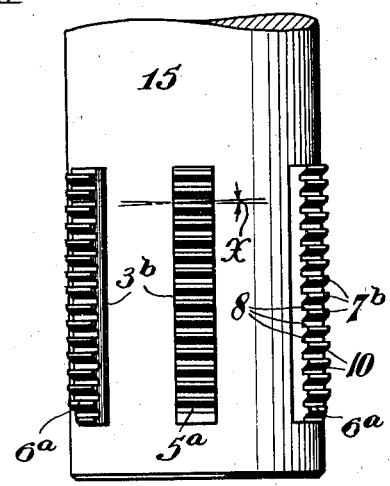

While the above description relates to threading dies for the cutting of external threads, the principles involved may likewise be applied to threading taps for the cutting or forming of internal threads. Thus, Figure 7 shows generally a tap spindle or head 15 having chaser seats 3$^b$ therein extending parallel with the axis of the tap to receive chasers or cutters 5$^a$ and 6$^a$, which chasers or any of them may be provided with inclined cutting teeth 7$^b$ for flank cutting clearance as before described.

Figure 8:
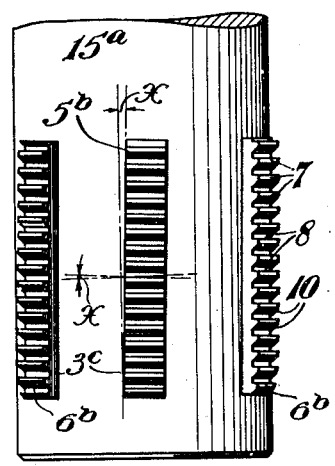

Further, as in Figure 8, the tap spindle or head 15$^a$ may be provided with a plurality of seats 3$^c$ having an inclination $x$ with the axis of the tap for receiving chasers 5$^b$ and 6$^b$, said inclination $x$ providing a corresponding flank cutting clearance in the manner described.

It is therefore apparent that the clearance provided in the manner of my invention may be readily incorporated in threading taps or dies for accurately forming or cutting buttress threads or the like, and that the threads so cut will be sharply and truly formed without imperfections due to rubbing or burning. Further, that my invention provides a highly efficient and economical manner of forming such threads in commercial practice.

Various changes and modifications are contemplated within the scope of the following claims.

I claim:

1. A threading chaser for cutting threads having a flank thereof substantially normal to the thread axis, including cutting teeth of uniform profile throughout their lengths and having cutting edges for cutting said flank, said teeth being of less thickness throughout than the distance between the teeth of the finished thread and being inclined rearwardly from said flank cutting edges for clearance between said teeth and the thread flank cut thereby.

2. A threading tool for cutting threads having a flank thereof substantially normal to the thread axis, including a head, thread chasers mounted on said head, said chasers having cutting teeth of uniform profile throughout their lengths and including cutting edges for cutting said flank, said teeth being of less thickness throughout than the distance between the teeth of the finished thread and being inclined rearwardly from said cutting edges to provide clearance between said teeth and the thread flank cut thereby.

3. A threading tool for cutting threads having a flank thereof substantially normal to the thread axis, including a head having a series of chaser seats therein extending in parallel relation to the axis of the head, a series of chasers in said seats and having cutting teeth including cutting edges for cutting said thread flank, the teeth of said chasers being of less thickness throughout than the distance between the teeth of the finished thread, the chasers having their leading and trailing faces inclined with respect to the teeth thereon and coacting with the chaser seats to incline the chaser teeth rearwardly from the flank cutting edges thereof to provide clearance between said teeth and the thread flank cut thereby.

4. A threading tool for cutting threads having a flank thereof substantially normal to the thread axis, including a head having a series of chaser seats therein extending at an inclination to the axis of the head, a series of chasers having cutting teeth including cutting edges for cutting said flank, the teeth of said chasers being of less thickness throughout than the distance between the teeth of the finished thread, said chasers being mounted in the inclined seats whereby the chaser teeth are inclined rearwardly from the flank cutting edges thereof, to provide clearance between the teeth and the thread flank cut thereby.

5. A threading tool for cutting threads having a flank thereof substantially normal to the thread axis, including a head, plural series of chasers mounted on said head, the chasers of one series having cutting teeth of uniform profile throughout their lengths and including cutting edges for cutting said flank, said series having the teeth thereof inclined rearwardly from said cutting edges to provide clearance between said teeth and the thread flank cut thereby, and a second series of chasers for cutting the other thread flank, the teeth of all of said chasers being of less thickness throughout than the distance between the teeth of the finished thread.

6. A threading chaser including a series of cutting teeth formed thereon of uniform profile throughout their lengths and having straight flank cutting edges for cutting a thread flank substantially normal to the thread axis, said chaser having its leading and trailing faces inclined relatively to the teeth to provide clearance rearwardly from said flank cutting edges upon positioning the chaser with its said faces parallel with the axis of the thread to be cut thereby, the teeth of said chaser being of less width throughout than the distance between the teeth of the finished thread.

7. A threading tool for cutting threads having a flank thereof substantially normal to the thread axis, including a head having a series of chaser seats therein, a series of chasers having parallel flanks mounted in said seats, said chasers having cutting teeth of uniform profile throughout their lengths and including cutting edges for cutting said thread flank, the teeth of said chasers being of less thickness throughout than the distance between the teeth of the finished thread, the chaser flanks and said seats being related to impart an inclination to the teeth rearwardly from their said cutting edges to provide clearance between the teeth and the thread flank cut thereby.

SAMUEL WEBB.